L. MOONEY.
Churn.
No. 60,035.
Patented Nov. 27, 1866.
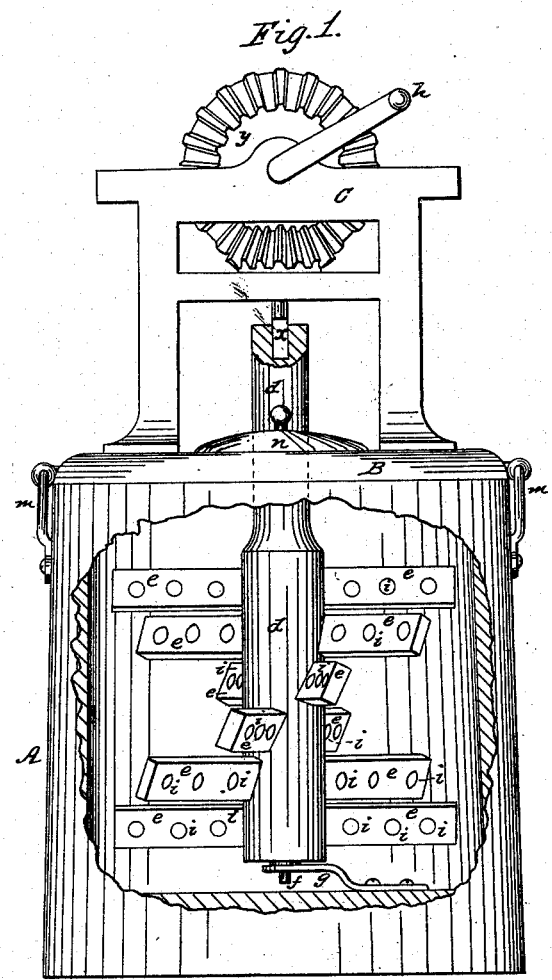
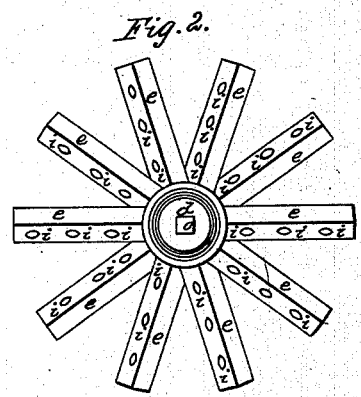
Witnesses:
James McBride
James J. Johnston
Inventor:
Laurence Mooney

UNITED STATES PATENT OFFICE

LAWRENCE MOONEY, OF ALLEGHENY, PENNSYLVANIA.

IMPROVEMENT IN CHURNS.

Specification forming part of Letters Patent No. 60,035, dated November 27, 1866.

*To all whom it may concern:*

Be it known that I, LAWRENCE MOONEY, of Allegheny, in the county of Allegheny and State of Pennsylvania, have invented a new and useful Improvement in Churns; and I do hereby declare that the following is a full and exact description thereof, reference being had to the accompanying drawings, and to the letters of reference marked thereon.

My invention consists in so arranging the breakers or dashers of a churn with relation to the shaft to which said breakers or dashers are attached that said breakers or dashers will throw two counter-currents of the milk or cream, the reaction of said currents causing the milk or cream to flow spirally down and around the shaft, and gather the butter as it is formed into two balls, the whole being constructed, arranged, and operating in the manner hereinafter described.

To enable others skilled in the art to make and use my invention, I will proceed to describe its construction and operation.

In the accompanying drawings, which form part of my specification, Figure 1 represents a front elevation of my improved churn, representing a portion of the churn-barrel broken away for the purpose of showing the arrangement of the breakers or dashers, and their relation to the shaft to which they are attached. Fig. 2 represents a top view of the breakers or dashers and their shaft, and also represents the relation of said breakers or dashers to said shaft.

In the drawings, A represents the barrel of the churn. B represents the lid, which is held down to its place on the churn-barrel by means of two hooks, (marked *m*.) In the lid is a small opening, which is covered by a lid, (marked *n*.) This small opening is used for the purpose of examining the progress of the churning process, and for the admission of air or water when necessary to the process of making butter—to wit, to raise or lower the temperature of the milk or cream to the proper degree, which is about 60° Fahrenheit. The frame C is secured to the lid B, and is used for supporting the driving-gear, which consists of wheels *y* and *u*, shaft *t*, and crank *h*. The breakers or dashers *e* are secured and arranged spirally in the shaft *d*, so that their transverse plane shall be in an oblique angle to the plane of the shaft *d*, as clearly shown in Fig. 1. The lower end of the shaft *d* is provided with journal *f*, which is placed in a step, *g*, secured to the bottom of the churn, and the upper end of the shaft is provided with a square opening, into which is fitted the square end *x* of the shaft *t*.

The operation of my improved churn is as follows: Having all things constructed and arranged as herein described and represented, I put the desired quantity of cream or milk in the churn, and impart a revolving motion to the breakers or dashers *e* by turning the crank *h*, and the revolving of the breakers or dashers will act on the cream or milk, so that each of the breakers or dashers on one side of the shaft will throw or force the cream or milk in a downward current, and on the other side of the shaft they will throw or force it in an upward current, and these two currents, coming in contact, will cause the cream or milk to flow spirally down and around the shaft *d*, and gather the butter as it is formed into two balls, which I remove from the churn and treat in the ordinary mode of washing, working, and dressing butter.

Having thus described the nature, construction, and operation of my improvement, what I claim as of my invention is—

Arranging the breakers *e* with relation to the shaft *d*, so that they will throw two counter-currents of the milk or cream, the reaction of which will cause the milk or cream to flow spirally down and around the shaft *d*, and thereby gather the butter as it is formed into two balls or rolls, the whole being constructed, arranged, and operating substantially as herein described, and for the purpose set forth.

LAWRENCE MOONEY.

Witnesses:
JAMES J. JOHNSTON,
ALEXANDER HAYS.